United States Patent
Nowlin et al.

(10) Patent No.: US 7,610,248 B1
(45) Date of Patent: Oct. 27, 2009

(54) WEIGHT MEASURING SYSTEMS AND METHODS

(75) Inventors: Jeffrey G. Nowlin, Council Bluffs, IA (US); Scott J. Smith, Fremont, NE (US); Fred C. Casto, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1675 days.

(21) Appl. No.: 10/028,888

(22) Filed: Dec. 19, 2001

(51) Int. Cl.
*G06Q 99/00* (2006.01)
(52) U.S. Cl. ............ 705/401; 705/400; 705/406; 705/407; 705/408; 705/410; 235/375
(58) Field of Classification Search ............ 705/400, 705/401, 406, 407, 408, 410; 235/375
See application file for complete search history.

(56) References Cited

U.S. PATENT DOCUMENTS

| | | | | |
|---|---|---|---|---|
| 5,177,687 A | * | 1/1993 | Baggarly et al. | 705/406 |
| 5,264,665 A | * | 11/1993 | Delfer, III | 705/406 |
| 5,327,701 A | | 7/1994 | Dronsfield | |
| 5,388,815 A | * | 2/1995 | Hill et al. | 270/32 |
| 6,094,894 A | | 8/2000 | Yates | |
| 6,164,043 A | | 12/2000 | Miller et al. | |
| 6,202,005 B1 | | 3/2001 | Mahaffey | |

FOREIGN PATENT DOCUMENTS

EP 0621563 A1 * 10/1994

OTHER PUBLICATIONS

Unknown Author, "HCL Infosystems to market Pitney Bowes electronic inserting", Dec. 14, 2000, 2p., www.financialexpress.com.*
Unknown Author, "Pitney Bowes exhibits low and mid range products at IDMF", Mar. 2002, 3p. www.pitneybowes.co.uk.*
Internet, Pitney Bowes, *Direct Connect™ Inserter Control System*, www.pb.com, Apr. 5, 2002.
Internet, Pitney Bowes, *DM 9 Series Inserting System*, www.pb.com, Apr. 5, 2002.
Internet, Pitney Bowes, *Production Mail Inserters*, www.pb.com, Apr. 5, 2002.
Internet: Pitney Bowes, *5 Series Desktop Inserting System*, www.pb.com, Apr. 5, 2002.

* cited by examiner

*Primary Examiner*—Akiba K Robinson Boyce
(74) *Attorney, Agent, or Firm*—Townsend and Townsend and Crew LLP

(57) ABSTRACT

A method for producing and weighing a mailing unit that is formed from a plurality of components including inserts and envelopes comprises the steps of determining a weight for each of the components and electronically storing a record of the weights. The inserts are placed into the envelope to form the mailing unit, and the weight of the mailing unit is determined based on the weights of the components utilized to form the mailing unit that are stored in the weight record.

28 Claims, 4 Drawing Sheets

WEIGHT MEASURING SYSTEMS AND METHODS

BACKGROUND OF THE INVENTION

This invention relates generally to the field of mail processing, and in particular to the determination of the proper postage for mailings. More specifically, the invention is related to systems and methods for determining the proper postage of mailings without physically weighing each mailing.

Financial institutions, long distance telephone carriers, and a number of other organizations often desire to send a card and accompanying paperwork or other mail types to a client or potential client. For example, a new credit card customer may fill out a written form, and submit this information to a financial institution. Upon approval of the customer's credit, the financial institution then prepares and sends a credit card to the new customer, along with a paper card carrier and/or documentation. In order to send the card and documents to a customer, the information often is sent to another company to produce and issue cards on their behalf. For example, one such card issuing company is First Data Corporation (FDC).

To issue a card, the financial institution sends the information to FDC, typically in electronic form. Using this information a card is embossed and initialized with the appropriate information. The card is typically matched with a card carrier, such as a paper insert having an adhesive strip or slots adapted to receive the card. The card and card carrier are then placed into an envelope using automated equipment, such as a machine from Böwe Systec Group, headquartered in Augsburg, Germany. In some cases, additional pages or inserts may also be included. The automated processing of the cards, card carriers, inserts, statements and the like typically involves a multi-step process leading to the creation of a packet that is inserted into an envelope for mailing.

Related processes may also be employed to send mailings to individuals without the use of a card. For example, monthly financial statements are typically sent to consumers and include transaction information, outstanding balances, and the like and may be accompanied by inserts, such as marketing and advertising information, negotiable instruments, and the like. These materials may also be organized and placed into envelopes using commercially available mail processing equipment.

Whenever a mailing is sent, the weight of the mailing typically needs to be known in order to determine the appropriate postage. One standard way of determining the appropriate postage is simply to physically weight each envelope and then apply postage depending on the weight. However, this process can be inefficient and time consuming. In some cases, weighing is forgone in lieu of simply estimating the weight of the heaviest envelope as a safety measure. In so doing, the same postage is paid on all packets, even if they would have qualified for a lower postage based on their weight.

BRIEF SUMMARY OF THE INVENTION

The invention provides exemplary systems and methods for determining the weight of mailing units so that the proper postage may be determined. Such mailing units may be formed from a plurality of components such as inserts and envelopes. According to one exemplary method, the weight of such a mailing unit is determined by first determining the weight of each of the components. This information is then electronically stored. At least some of the inserts are then placed into the envelope to form the mailing unit. The weight of the mailing unit is determined based on the sum of the weights of the components utilized to form the mailing unit. These weights are electronically stored in the weight record. In this way, the weight of the mailing unit may be determined electronically, without the need to physically weigh the mailing unit.

A variety of techniques may be used to electronically determine the weight of the mailing unit. For example, the components that are to be used in the mailing unit may be determined before any of the components are assembled. As such, the weight of the mailing unit may be determined by electronically summing the weights of the components of the mailing unit prior to assembly of the mailing unit. Conveniently, the configuration of different types of mailing units may be electronically stored and associated with an identifier. In this way, an identifier on one of the inserts may be read by a reader to determine the components of the mailing unit. Hence, once the identifier is read, the weight of the mailing unit may be determined prior to its assembly.

As another example, the weight may be determined by summing the weights of the components utilized to form the mailing unit as the components are selected for inclusion in the mailing unit. For instance, sensors may be used to confirm each time a component is added to the mailing unit and that all of the inserts are placed into the envelope. Upon each confirmation, the total weight of the mailing unit is increased until the process is completed. In this way, if an insert is for some reason omitted, the weight of the mailing unit is not increased, thereby potentially reducing the amount of required postage. Conveniently, an identifier on one of the inserts, such as a bar code or other markings, may be read in order to determine the components that are to be selected.

In one aspect of the method, the inserts may be held in groups that are disposed along a track. The inserts may then be selected from their respective groups and placed onto the track. This selection may be based on the identifier read from one of the inserts. After all of the inserts have been placed onto the track, the inserts are stuffed into the envelope. The envelopes may then be routed or otherwise organized into appropriate postage groups based on their weight.

A wide variety of inserts may be used according to the invention. For example, the inserts may comprise financial statements, envelopes, negotiable instruments, charge cards that are attached to card carriers, marketing and advertising information, and the like.

In another embodiment, a system for producing and weighing mailing units comprises a controller having a processor and a memory containing the weight of each of the components of the mailing units. The system also includes a movable track, a plurality of inserting locations along the track that are adapted to hold the inserts, and a plurality of inserting mechanisms that are adapted to place certain inserts onto the track. One example of a tower type inserting mechanism that may be used is described in copending U.S. application Ser. No. 09/828,585, filed Apr. 5, 2001, the complete disclosure of which is herein incorporated by reference. A moving mechanism is employed to move the inserts from the track and into an envelope to form a mailing unit. Further, the controller is configured to determine the weight of the mailing unit based on the weights of the components utilized to form the mailing unit that are stored in the memory. Hence, such a system permits the weight of each mailing unit to be determined by the processor, rather than being physically weighed.

In one aspect, at least one of the inserts may have an identifier, and the system further includes a reader to read the identifier. With such a configuration, the controller may be configured to determine the components of the mailing unit based on the identifier. After the components have been identified, the controller may sum the weights of the components of the mailing unit prior to assembly of the mailing unit. Alternatively, the controller may sum the weights of the inserts utilized to form the mailing unit as the inserts are placed onto the track.

The system may further include a sorting mechanism to sort the mailing units into groups based on their weights. Also, the system may utilize an external storage device, such as a database, having information on the weights to download to the controller.

DETAILED DESCRIPTION OF THE INVENTION

Figure 1A:
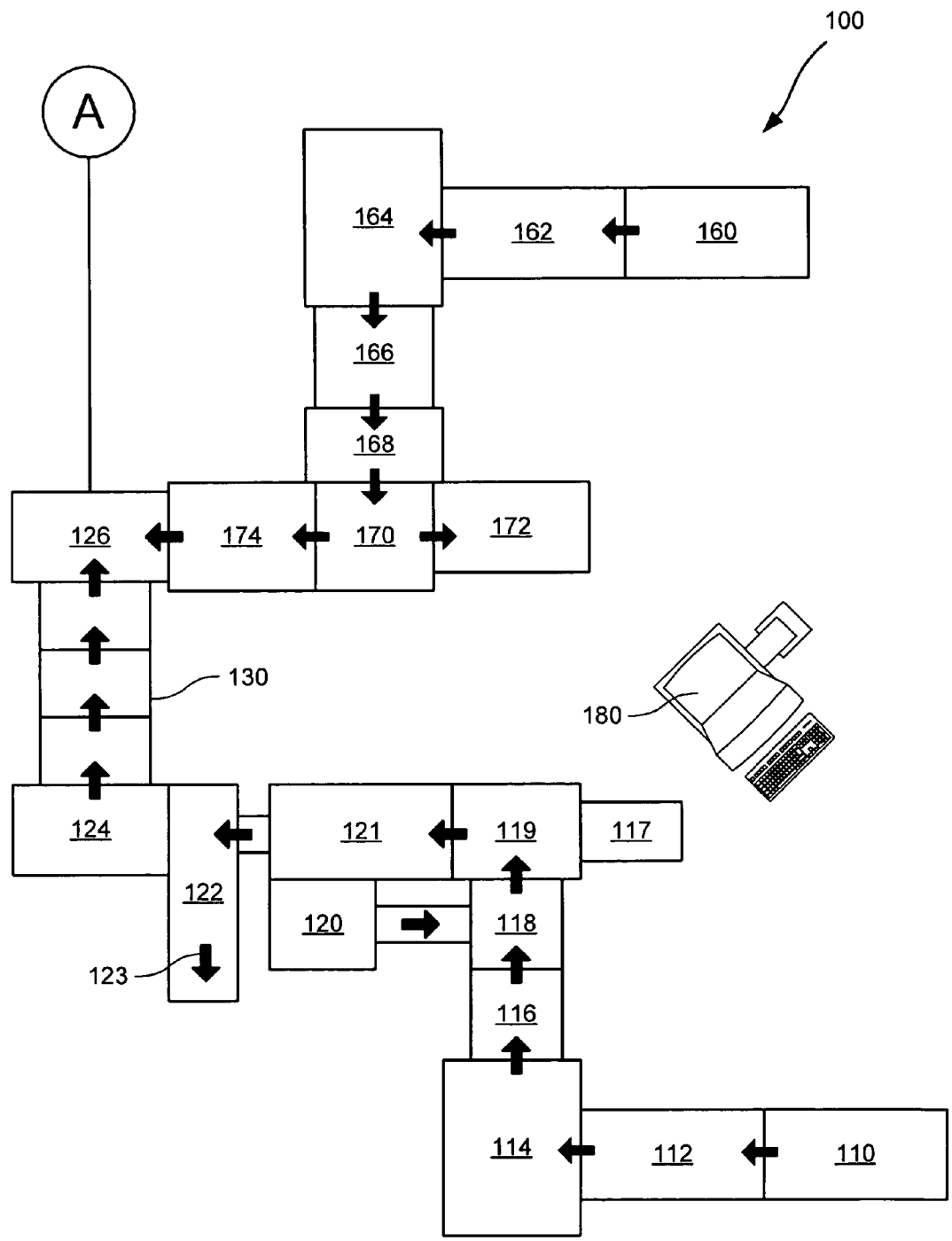
FIGS. 1A and 1B schematically illustrate one embodiment of a mail processing system according to the invention.

The invention provides systems and methods for producing mailing units and for determining the weight of such mailing units so that appropriate postage may be provided. Such systems provide weighing capabilities as the mailing units are being assembled, i.e., in real time. Hence, a single system may be used to both weigh and assemble. Such mailing units may be produced from a variety of components and are produced in a form suitable for mailing using conventional mailing systems. For instance, such mailing units may comprise a set of inserts that are held within an envelope or other mailing instrument. Such inserts may include other envelopes that are inserted into the envelope, cards, card carriers, marketing or advertising information, negotiable instruments, financial statements, other papers, letters, personal identification number (PIN) mailers, maps, other mail types and the like.

The weight of such mailing units may be determined without physically weighing the mailing unit. Instead, the individual components of the mailing unit are separately weighed and stored in some type of memory or database. This information is then accessed near or at the time the mailing unit is assembled to determine the weight of the mailing unit. Conveniently, the individual components may be weighed using a statistical sampling. For example, if a pallet of inserts of the same type is received in the receiving department, a selected sampling of the inserts may be removed and weighed. This weight may then be used for all of the inserts since they are of the same type and will therefore have approximately the same weight.

Once the weight of the components are stored, the weight of the mailing units may be calculated in a variety of ways. For example, prior to assembly a determination may be made as to the components that are to be used in a given mailing unit. As one example, a certain mailing unit may be determined to have a financial statement, an advertising insert, a return envelope and a sending envelope. The weight of each of these components may be accessed from memory and summed together to determine a weight of the mailing unit. As each of these mailing units is assembled, they are assigned the same pre-calculated weight. Conveniently, the type of mailing unit may be determined by including an identifier on the first of the inserts, and reading this identifier at the beginning of the assembly processes. Once this identifier is read, the final weight of the mailing unit may be calculated.

As another example, the weight of the mailing unit may be determined as the mailing unit is being assembled. For instance, using the above example, once the financial statement is selected the weight of the mailing unit becomes the weight of the financial statement. As the advertising insert is added to the mailing unit, its weight is added to that of the financial statement. This process is repeated until the mailing units is completely assembled. In this way, the weight of the mailing unit is determined by the components that are actually included in the mailing unit. As with the process described above, a first one of the inserts may include an identifier that is read to determine the composition of the mailing unit.

The invention may be used with a wide variety of mail processing systems and equipment. Merely by way of example, those disclosed in copending U.S. application Ser. Nos. 10/036,653 entitled "MAIL HANDLING EQUIPMENT AND METHODS" and 10/045,589 entitled "SYSTEMS & METHODS OF PROVIDING INSERTS INTO ENVELOPES", both filed on Nov. 8, 2001. Also, the invention may utilize intelligent inserting techniques to determine the appropriate inserts as described in copending U.S. application Ser. No. 10/028,449 (entitled REAL-TIME INTELLIGENT PACKET-COLLATION SYSTEMS AND METHODS), filed on the same date as the present application. The complete disclosures of all these references are herein incorporated by reference. Other types of mail processing equipment that may be used with the invention include those manufactured by Bell and Howell, Pitney Bowes, EML Document Systems, among others.

After weighing and assembly, the mailing units may be sorted in a variety of ways. For example, the mailing units may be sorted with one or more sorting mechanisms into bins or locations based on a postage classification. In some cases, postage may also be applied. To further classify each sorted category, a marking mechanism may be used to mark mailing units that fall into different weight categories. For example, a mail processing machine may be configured to sort the mailing units into two groups: those less than two ounces and those greater than two ounces. The marking mechanism may be configured to produce a colored mark on the side of any mailing units that are three ounces or greater. When the mailing units are stacked, the marked mailing units may easily be visualized and removed from the stack for additional postage.

Figure 1B:
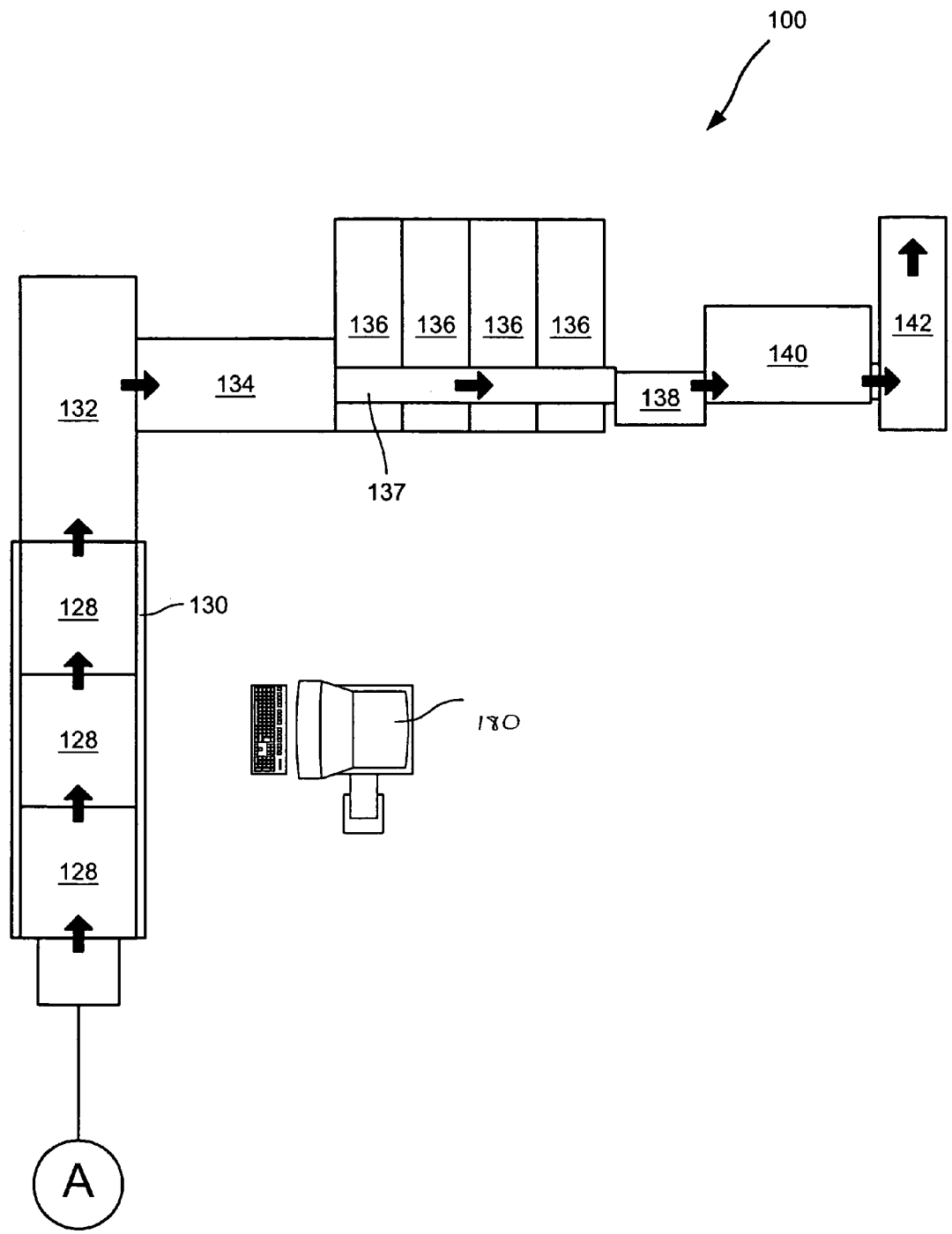

One example of a mail processing system 100 that may be used with the weighing techniques is described in FIGS. 1A and 1B. System 100 includes a series of stations adapted to produce an envelope having a desired number of paper documents and one or more cards. Cards processed by system 100 can include credit cards, debit cards, company and stored-value cards, smart cards, phone cards, and the like. Documents processed by system 100 include one or more sheets of paper, such as a customer billing statement, a new cardholder agreement, a renewal card statement, a card carrier, and the like. Documents also may include a variety of paper inserts, such as advertisements and the like.

In the embodiment shown in FIGS. 1A and 1B, system 100 includes a printer 110 adapted to print alpha numeric characters on a statement, a sheet of paper, a card carrier, or the like. Printer 100 prints information such as an account number, a customer name and mailing address, a monetary account limit, and the like, and further may print one or more bar codes. In one embodiment, at least one of the bar codes identifies which inserts, from a plurality of different inserts, are to be sent to the customer with the statement or card.

The printed statements or card carriers (not shown) travel down a belt 112 and are stacked in a stacking unit 114.

Stacking unit 114 may operate to at least partially fold the statement or card carrier. The sheets are then sequentially drawn from stacking unit 114 into unit 116.

In one embodiment, unit 116 includes a bar code reader for reading a bar code or other type of identification mark on the statement or card carrier. The bar code may, for example, identify which inserts are to be later matched up with the card carrier. In another embodiment, unit 116 also reads a number, such as a three digit number, associated with the card carrier to facilitate proper matching with a card having a corresponding number. Information obtained from the bar code may also be used to determine the overall weight of the mailing unit as described hereinafter.

In one embodiment, the card carrier is transferred from unit 116 into unit 118. A card is received from unit 120 and matched with the corresponding card carrier in unit 118. In one embodiment, the card is glued, placed in slots or otherwise affixed to the card carrier in unit 118. The mated card carrier and card are transferred to unit 119. If a processing error has occurred, unit 119 deflects the card and card carrier into a bypass tray or receiving area 117. Processing errors may include, for example, mismatched cards and card carriers, and the like. If no error has occurred, unit 119 deflects the card and card carrier into a folding unit 121.

Folding unit 121 performs a fold of the statement or card carrier. In one embodiment, folding unit 121 performs a second fold of the card carrier, resulting in a card carrier that is approximately the size of a business class envelope. In a particular embodiment, the first and second folds of the card carrier produce a Z-fold card carrier. Folding unit 121 further includes a card detection assembly, which operates to detect if the card is missing or if too many cards have been placed in the card carrier. In one embodiment, the card detection assembly tests a thickness of the card carrier to determine if the appropriate number of cards are contained in the card carrier.

If the card detection assembly indicates an error, such as too many cards or a missing card(s), the card carrier is transferred to a bypass tray or receiving area in the direction shown by arrow 123. Transfer may occur along a conveyor belt, a track, or the like. In one particular embodiment, system 100 operates to place cards in card carriers, but is not used for processing further inserts. In this embodiment, the card carriers and cards are passed down conveyor 122 in the direction of arrow 123, and removed from system 100. The card carriers may, if desired, be transported to another type of inserter, an envelope stuffing apparatus, a mail room or the like. If delivered to another type of inserter (such as the one shown in FIG. 2), their weight may be determined by reading the information on the bar code since this information may already have been calculated.

If the card detection assembly does not indicate an error, in one embodiment, card carriers are then passed to a paddle wheel assembly 124 to continue processing. As shown in FIG. 1A, paddle wheel 124 operates to place the carrier and card on a track or conveyor belt 130. The cards and card carriers proceed down belt 130, passing under a second paddle wheel assembly 126. In one embodiment, second paddle wheel assembly 126 places a second statement, sheet of paper or the like on top of the card carriers as they pass underneath. For example, the second sheet may contain additional information pertinent to the client or the client account, a cardholder agreement, or the like.

As shown in FIG. 1A, a second printer 160 is adapted to print out the numerical characters and/or bar codes on a second statement or sheet of paper. For example, printer 160 may further print one or more pages of checks for a card user to use. In one embodiment, printer 160 is electrically coupled to the bar code reader in unit 116. In this manner, bar code reader 116 may read the bar code or other identification mark on the card carrier processed through unit 116 and inform printer 160 that a second statement or page is needed to be matched up with the card carrier. In one embodiment, a controller 180 facilitates the communication between unit 116 and printer 160. The printed second statement or page passes from printer 160 along a belt 162 and into a stacking unit 164. Stacking unit 164 is similar to stacking unit 114, and performs similar functions. For example, stacking unit 164 stacks a plurality of statements, and then passes the statements one at a time to unit 166 after performing a first fold. Unit 166 is similar to unit 116, and may include a bar code reader for reading a bar code or other identification marks on the statement. Unit 166 further may perform a fold of a second statement in the event the fold is not performed in unit 164. The second statement then passes to unit 168, in which a second fold of the statement is performed. In this manner, the second statement or page, in one embodiment, is a Z-folded second statement to match the general size of the first statement or card carrier. The second statement passes into unit 170, which in one embodiment is a deflection unit 170 similar to unit 119 described above. Deflection unit 170 passes statements to bypass station 172 in the event the second statement is not to be matched with the first statement. For example, bypass unit 172 receives second statements that may have been printed in error. Deflection unit 170 further directs second statements to belt 174 for transporting second statements to second paddlewheel 126. The second statement is then matched with the first statement or card carrier as described above.

The matched pages and card combination proceed along a track or conveyor belt 130, passing under one or more insert bins 128. FIG. 1B depicts three (3) insert bins 128, although a larger or smaller number of bins 128 also may be used within the scope of the present invention. In one particular embodiment, system 100 includes six (6) insert bins 128.

Insert bins 128 contain inserts, such as paper advertisements and informational inserts. These inserts may be added to a particular customer's stack of documents and card passing beneath on belt 130. Inserts contained within bins 128 may be selectively chosen based upon a number of criteria, including customer interest and other factors. For the system 100 shown in FIG. 1 having three bins 128, some customers may receive all three inserts, other customers may receive less than three inserts, while still other customers may receive no inserts.

In one embodiment, the statements and cards traverse along belt 130 positioned underneath bins 128. In one embodiment, belt 130 provides continuous, fluid movement of the statements. In another embodiment, belt 130 provides incremental movement of the statements, with each statement stopping below each bin 128. Inserts desired to be matched with a particular customer's statements are pulled from bins 128 and placed atop the customer's statement. Upon reaching the end of belt 130, the stack of documents to be sent to the customer are transferred to unit 132 for insertion into an envelope.

The envelope containing a particular customer's statement, inserts and card, is sent to an envelope sealing unit 134. Envelope sealing unit 134 sprays a mist of water or other fluid on the envelope flap and proceeds to seal the moistened flap. Unit 134 further flips the envelope over to expose the envelope front. In one embodiment, envelopes processed through system 100 are windowed envelopes, with information printed on the card carrier or other insert exposed through the envelope window.

System 100 includes one or more controllers 180 for monitoring and/or controlling the process through system 100. An operator may view the status of documents on the computer screen associated with a particular controller 180, and/or input data as needed into controller 180 to facilitate operation of system 100. Further, controllers 180 facilitate the coordination between printers 110, 160, bar code readers in system 100 and insert bins 128, to ensure each customer receives the desired card(s) and document(s).

Another function of controller 180 is to determine the weight of each mailing unit. This may be accomplished by storing in the memory of controller 180 the weights of each component of the mailing unit. For example, a weight may be assigned to each statement, card carrier, card, insert, envelope and the like. This information may be directly entered into controller 180 or transmitted from another computer system. For example, the components of the mailing unit may be weighed when received at a shipping dock and entered into a computer. This information may then be electronically transmitted to controller 180. As the reader in unit 116 reads the bar code from the statement or card carrier, this information is sent back to controller 180. In turn, controller 180 determines the components of the mailing unit using the bar code information. Because a weight is assigned to each component, the weight of the mailing unit may also be determined by controller 180 simply by summing the weights of the included components.

In some cases, the bar code may include information indicating that the mailing unit should receive an insert from every insert bin 128 that is loaded with inserts and placed in the "on" position. As such, the overall weight may be determined by simply including the weights of all inserts in a bin that is in the "on" position. If a bin runs out of inserts, it may be placed in the "off" position so that the weight of these inserts (which are not in the bin) are not added to the weight of the mailing unit. In other cases, the bar code may contain information that inserts from only certain of insert bins 128 should be included as described in copending application Ser. No. 10/028,449, filed on the same date as the present application, previously incorporated by reference. In such a case, the overall weight may be determined by only including the inserts from those certain bins. As another alternative, sensors may be associated with each inserting bin, other printers, and the like, so that as each component is selected and added to the mailing unit, a signal is sent back to controller 180. The weight of the mailing unit is then determined as each component is added.

Once the mailing unit has been completed, it has an assigned weight. As such, its location may be monitored through the rest of system 100 so that its weight remains known. Various sensors may be used to track its location within system 100.

With the weight known, the mailing units may be organized in a variety of ways depending on how the mailing unit is to be shipped or mailed. For example, the mailing units may be organized into different groups based on their weight for U.S. mail, based on mailing priority, based on the type of carrier, such as FedEx, Airborne Express, and the like. Further, in some cases postage may be placed onto the mailing unit while still in system 100 based on its weight.

Some examples of how the mailing units may be organized is illustrated in FIG. 1B. As shown, the mailing units may proceed into one or more diverters 136. Diverters 136 may divert mailing units for a variety of reasons, including, but not limited to, additional processing errors, and mailing units requiring special or additional handling. In one embodiment, at least one diverter 136 is used for mailing units to be sent by overnight courier, such as Federal Express. In another embodiment, at least one diverter is used to receive mailing units intended to be sent by airmail, or the like. Mailing units intended for standard mail delivery, such as by the U.S. Postal Service First Class Delivery, are put past diverters 136 along belt or track 137 and proceed to a first postage meter 138. First postage meter 138 accesses controller 180 to determine the weight of the mailing unit that was previously calculated and applies a one ounce postage to the envelope is appropriate. If heavier than one ounce, the mailing units proceed to a second postage meter unit 140 and a second ounce of postage is applied if appropriate. The mailing units that have been postaged proceed to an output station 142 for delivery to the intended customers.

Hence, system 100 is able to compose a mailing unit while also determining its weight by electronically summing the weight of each of its components that are stored in memory. Once the mailing unit is completed, its weight is known, and the mailing unit may then be further processed, using the weight information if needed, such as when applying postage to the mailing unit.

Figure 2:
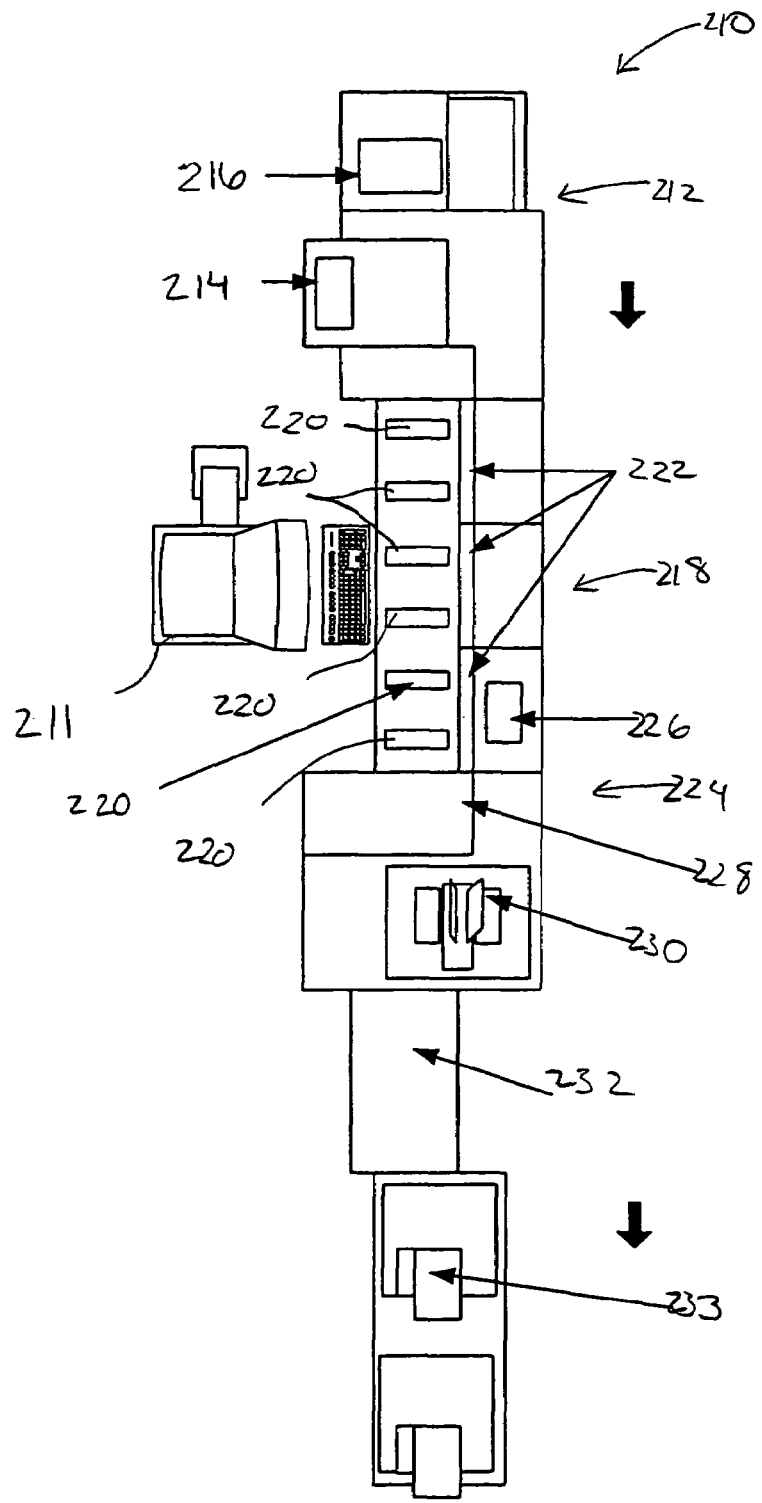
FIG. 2 schematically illustrates another embodiment of a mail processing system according to the invention.

The weighing techniques of the invention may also be used with other mail processing equipment. For example, FIG. 2 illustrates one embodiment of a mail processing machine 210 having the ability to calculate the weight of mailing units using the techniques previously described. Machine 210 comprises a central computer 211 for controlling its operations. Computer 211 may also include a memory having weight records for the components of mailing units processed by machine 210 in a manner similar to that described in connection with system 100. Machine 210 also includes a matching section 212 that is configured to match first sheets that each have a card with a corresponding second sheet. Matching section 212 has a first holding location 214 for holding pre-folded first sheets that each have a card and a corresponding bar code. Alternatively, the first sheets may be other types of documents that are not attached to a card, such as a financial statement or other letter. Matching section 212 further includes a second holding location 216 for holding pre-folded second sheets that also have a bar code. In operation, one sheet from each of the holding locations is advanced and its bar code scanned to ensure that the two sheets are to be matched. If so, they are stacked onto a conveyor that extends along machine 210. Alternatively, second holding location 216 may be modified to hold flat sheets and may be placed downstream of first holding location 216. Second holding location 216 may include equipment to scan the bar code on the flat second sheets, fold the second sheets, and then place them on top of the corresponding first sheets that pass along the conveyor. The conveyor may be configured to advance specified lengths so that upon each advancement another second sheet is placed onto the corresponding first sheet that rests on the conveyor. Examples of such fold equipment that may be used include feeder/folding machines available from GBR, Germany and Lorente, Brazil. First holding location 214 may be constructed of a feeder, such as a Longford feeder, available from Longford Int.

The matched sheets then pass through an inserting section 218 having various insert feeders 220 for holding different inserts. Conveniently, inserting section 218 may be covered by clear door covers 222. As the matched sheets pass through inserting section 218, inserts from feeders 220 may be selectively added depending on certain pre-defined relationships that are stored in computer 211. For example, a profile may exist for the cardholder that is to receive the card. Based on this profile, computer 211 may select appropriate inserts for that card holder. For instance, if the cardholder's profile indicates a preference for playing golf, the insert may be an advertisement for a golf vacation.

After the appropriate inserts have been added, the matched sheets (and any inserts) pass along the conveyor to an envelope filling section 224 having an envelope feeder 226 and an envelope opener 228. The envelopes are opened by opener 228 and a mechanism is used to move the matched sheets from the conveyor and into the envelope to form a mailing unit. The envelope is then sealed and is flipped using a flipping mechanism 230 onto another conveyor 232.

To determine the weight of each mailing unit, computer 211 is employed to sum the weights of each of the components of the mailing unit. Computer 211 includes a weight record for each of the components and sums these values for each mailing unit. This may be accomplished by reading the bar code from the first sheet and sending this information to computer 211. Using this information, computer 211 determines the components to be included in the mailing unit and sums their weight values in a manner similar to that previously described. If the bar code indicates that the mailing unit should receive an insert from every insert feeder that is loaded with inserts, the overall weight may be determined by simply including the weights of all inserts in the feeders that are in the "on" position. If a feeder runs out of inserts, it may be placed in the "off" position so that the weight of these inserts (which are not in the feeder) are not added to the weight of the mailing unit. If the bar code contains information that inserts from only certain of insert feeders should be included, the overall weight may be determined by only including the inserts from those certain feeders. In a manner similar to that previously described, sensors may be associated with each insert feeder and holding location so that as each component is selected and added to the mailing unit, a signal is sent back to computer 211. The weight of the mailing unit is then determined as each component is added.

Once the weight has been determined, the location of the mailing unit is tracked in a manner similar to that previously described. Further, the mailing units may be organized based on their manner of shipment. For example, some of the envelopes may be inserted into a postage meter 233 where they are stamped with the appropriate postage based on their weight. Alternatively, the mailing units may simply be diverted to separate locations based on their weight so that appropriate postage may be applied.

Figure 3:
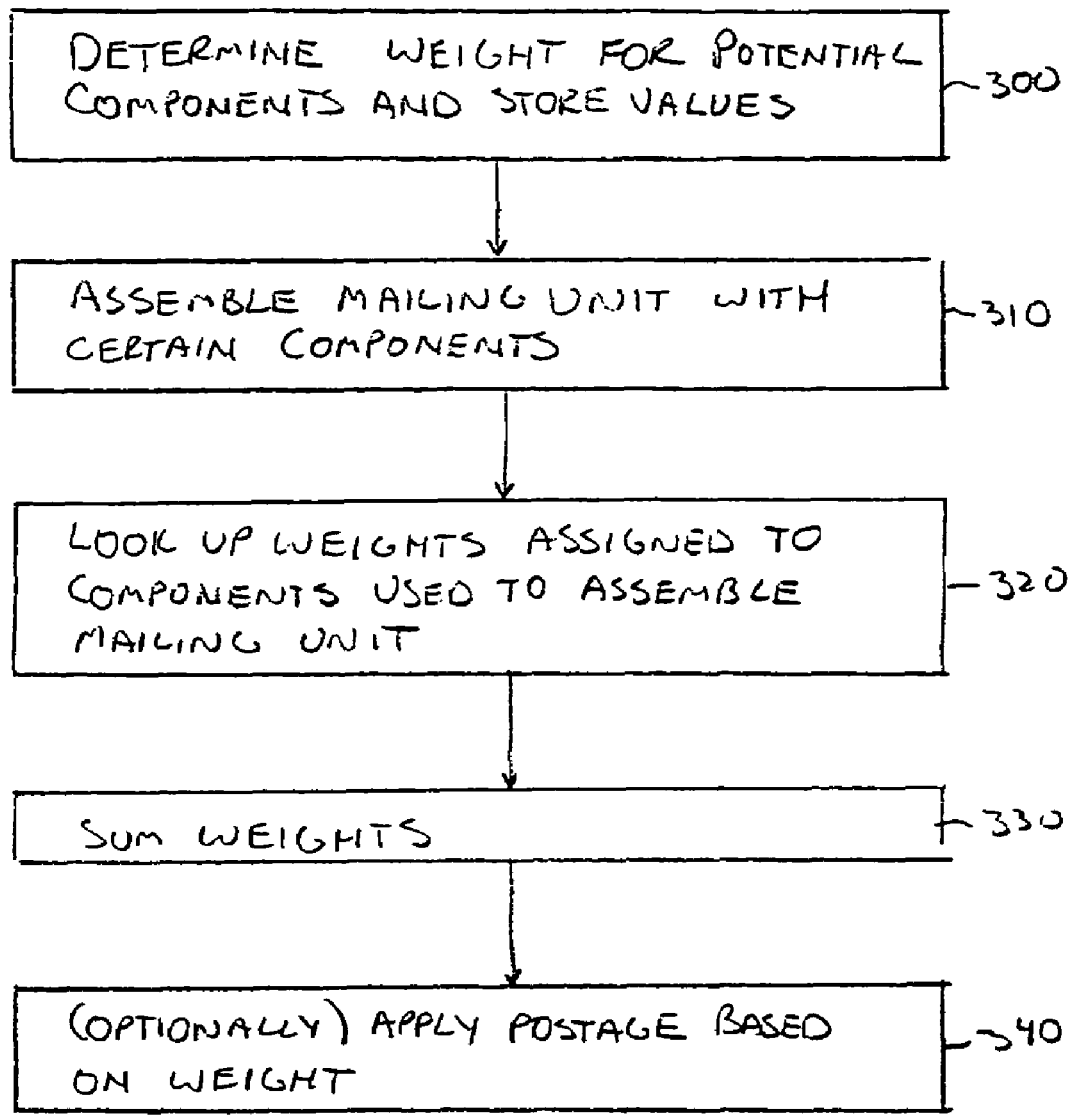
FIG. 3 is a flow chart illustrating one method for determining the weight of a mailing unit according to the invention.

Referring now to FIG. 3, one method for determining the weight of a mailing unit will be described. As shown in step 300, the weight of potential components of a mailing unit is measured and electronically stored. Conveniently, such weighing may occur upon receipt of the components from a supplier or publisher. If needed, these weights may be electronically transmitted to the mail processing machines.

At step 310, a mailing unit is assembled, typically using a mail processing machine. During assembly, some or all of the available components are selected for inclusion in the mailing unit. At step 320 a memory look up is performed to determine the weights that are associated with the components used to assemble the mailing unit. At step 330, these weights are summed to determine the overall weight of the mailing unit. This may be done before, during or after final assembly. Optionally, as shown in step 340, postage may be applied to the mailing unit based on the calculated weight.

The invention has now been described in detail for purposes of clarity and understanding. However, it will be appreciated that certain changes and modifications may be practiced within the scope of the appended claims.

The invention claimed is:

1. In a system for assembling a mailing unit for mailing, wherein the mailing unit is formed from a plurality of components including inserts and envelopes that are provided to the system, a method for producing and weighing the mailing unit, comprising:
   determining at a controller a weight for each of the components of the mailing unit and electronically storing a record of the weights at a memory in the system;
   printing at a printer in the system an identifier on one of the components forming the mailing unit after that one of the components has been provided to the system, wherein the identifier is used in identifying the components of the mailing unit;
   reading at a reader the identifier to determine the components of the mailing unit;
   placing the inserts into the envelope to form the mailing unit;
   determining the weight of the mailing unit based on the weights of the components utilized to form the mailing unit that are stored in the memory as a weight record.

2. A method as in claim 1, further comprising predetermining the components to be used in the mailing unit, and wherein the weight determining step comprises summing the weights of the components of the mailing unit prior to assembly of the mailing unit.

3. A method as in claim 1, wherein the weight determining step comprises summing the weights of the components utilized to form the mailing unit as the components are selected for inclusion in the mailing unit.

4. A method as in claim 3, wherein the summing step comprises retrieving from the memory and summing the weight of each component using a processor within the system upon selection of each of the components.

5. A method as in claim 1, wherein the inserts are held in groups that are disposed along a track, and further comprising selecting the inserts from their respective groups and placing them onto the track.

6. A method as in claim 5, further comprising placing the inserts on the track into the envelope.

7. A method as in claim 1, wherein one of the inserts comprises a financial statement.

8. A method as in claim 1, wherein one of the inserts comprises a charge card that is attached to a card carrier, and wherein the identifier is printed on the card carrier.

9. A method as in claim 1, wherein one of the inserts comprises a financial statement and another one of the inserts comprises a charge card that is attached to a card carrier, and wherein the identifier is printed on the card carrier.

10. A method as in claim 1, wherein the inserts are selected from a group consisting of letters, advertisements, checks, PIN mailers, phone cards and maps.

11. A method as in claim 1, further comprising organizing the mailing units based on a postage weight classification.

12. A method as in claim 11, further comprising marking and mailing units that are different in weight than their classification.

13. A system for producing and weighing mailing units that are formed from a plurality of components including inserts and envelopes, the system comprising:
   a controller having a processor and a memory containing the weight of each of the components;
   a printer for printing an identifier on one of the components forming the mailing unit after that one of the components has been provided to the system, wherein the identifier is used to identify the components of the mailing unit;

a reader for reading the identifier and providing the identifier to the controller;

a movable track;

a plurality of inserting locations that are adapted to hold the inserts, and a plurality of inserting mechanisms that are adapted to place selective ones of the inserts onto the track; and a moving mechanism that is adapted to move the inserts from the track and into an envelope to form a mailing unit;

wherein the controller is configured to determine the components of the mailing unit based on the identifier and to determine the weight of the mailing unit based on the weights of the components utilized to form the mailing unit that are stored in the memory.

14. A system as in claim 13, further comprising an external storage device having information on the weights to download to the controller.

15. A system as in claim 13, wherein the controller is configured to sum the weights of the components of the mailing unit prior to assembly of the mailing unit.

16. A system as in claim 13, wherein the controller is configured to sum the weights of the inserts utilized to form the mailing unit as the inserts are placed onto the track.

17. A system as in claim 13, wherein the inserts are selected from a group consisting of statements, card carriers, cards, and advertising information.

18. A system as in claim 13, further comprising a sorting mechanism to sort the mailing units into groups based on their weights.

19. A system as in claim 18, further comprising a marking mechanism to mark at least some of the mailing units based on their weights to classify the mailing units within a given group.

20. In a system for producing and weighing a mailing unit for mailing, wherein the mailing unit is formed from a plurality of components including inserts and envelopes provided to the system, a method comprising:

determining under the control of a processor a weight for each of the components of the mailing unit and electronically storing a record of the weights at a memory in the system;

printing under the control of the processor in the system an identifier on a first one of the components forming the mailing unit after the first component has been provided to the system, wherein the identifier is used to identify all the components of the mailing unit, and wherein the first component comprises a sheet of paper for insertion into an envelope;

reading the identifier to determine all the components of the mailing unit;

placing the inserts into the envelope to form the mailing unit based on the identifier; and determining under the control of the processor the weight of the mailing unit by retrieving from the memory the weights of the components utilized to form the mailing unit that are stored in the memory and summing those the weights of the components using the processor.

21. The method of claim 20, wherein the first component is a card carrier for insertion into the envelope, wherein a second of the components comprises a card for attachment to the card carrier, wherein the identifier is printed on the card carrier before having the card attached thereto, and wherein the identifier identifies a specific card for attachment to the carrier.

22. The method of claim 20, wherein the first component is a financial statement and wherein the identifier printed on the financial statement identifies a particular customer and a plurality of inserts that are to be inserted into the envelope with the financial statement and that are matched to the particular customer.

23. The method of claim 20, wherein the method further comprises printing under the control of the processor in the system an identifier on a second one of the components forming the mailing unit, the identifier printed on the second component based on the identifier read from the first component.

24. A system for producing and weighing a mailing unit that is formed from a plurality of components including inserts and envelopes that are provided to the system, the system comprising:

a controller having a processor and a memory containing the weight of each of the components;

a printer for printing an identifier on a first one of the components forming the mailing unit after the first component has been provided to the system, wherein the identifier is used to identify all the components of the mailing unit, and wherein the first component comprises a sheet of paper for insertion into an envelope;

a reader to read the identifier;

a movable track;

a plurality of inserting locations that are adapted to hold the inserts, and a plurality of inserting mechanisms that are adapted to place selective ones of the inserts onto the track; and a moving mechanism that is adapted to move the inserts from the track and into an envelope to form a mailing unit;

wherein the controller is configured to determine the components of the mailing unit based on the identifier read from the first component by retrieving from the memory the weights of the components utilized to form the mailing unit that are stored in the memory and summing those weights.

25. The system of claim 24, wherein the first component is a card carrier for insertion into the envelope, wherein a second one of the components comprises a card for attachment to the card carrier, wherein the identifier is printed on the card carrier before having the card attached thereto, and wherein the identifier identifies a specific card for attachment to the carrier.

26. The system of claim 24, wherein the first component is a financial statement and wherein the identifier printed on the statement identifies a particular customer and a plurality of inserts that are to be inserted into the envelope with the financial statement and that are matched to the particular customer.

27. The system of claim 24, further comprising a second printer for printing an identifier on a second one of the components forming the mailing unit, the identifier on the second component based on the identifier read from the first component.

28. The system of claim 27, wherein the first component is a card carrier, wherein the identifier printed thereon identifies a particular customer when read by the reader and is provided to the controller, and wherein the second component is a financial statement matched to the particular customer by the controller.

* * * * *

UNITED STATES PATENT AND TRADEMARK OFFICE
CERTIFICATE OF CORRECTION

| | | |
|---|---|---|
| PATENT NO. | : 7,610,248 B1 | Page 1 of 1 |
| APPLICATION NO. | : 10/028888 | |
| DATED | : October 27, 2009 | |
| INVENTOR(S) | : Nowlin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1855 days.

Signed and Sealed this
Twenty-eighth Day of December, 2010

David J. Kappos
*Director of the United States Patent and Trademark Office*